No. 878,954. PATENTED FEB. 11, 1908.
H. K. HOLSMAN.
DRIVING MECHANISM FOR AUTOMOBILES, &c.
APPLICATION FILED APR. 20, 1907.
3 SHEETS—SHEET 1.
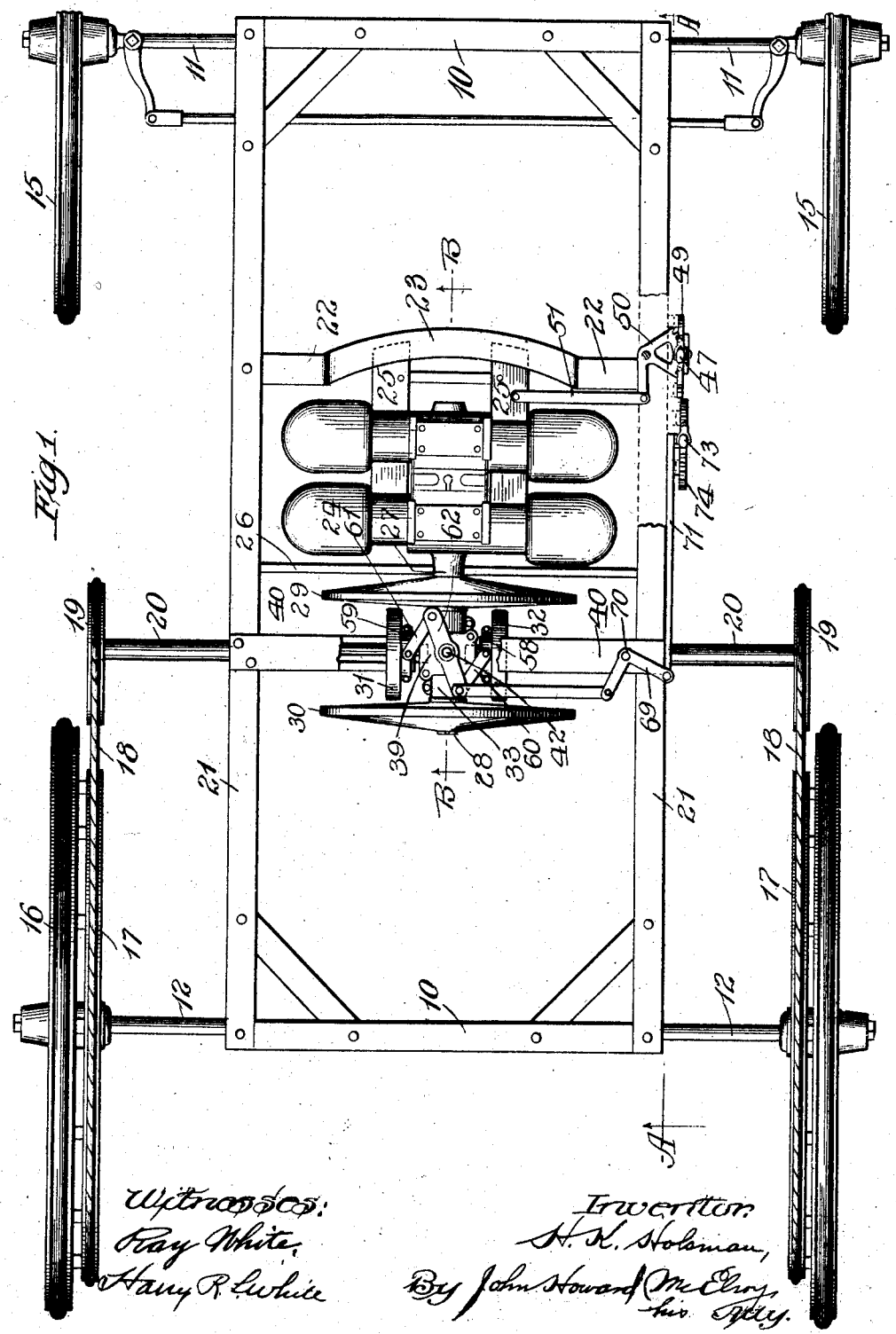

No. 878,954.
PATENTED FEB. 11, 1908.
H. K. HOLSMAN.
DRIVING MECHANISM FOR AUTOMOBILES, &c.
APPLICATION FILED APR. 20, 1907.
3 SHEETS—SHEET 2.
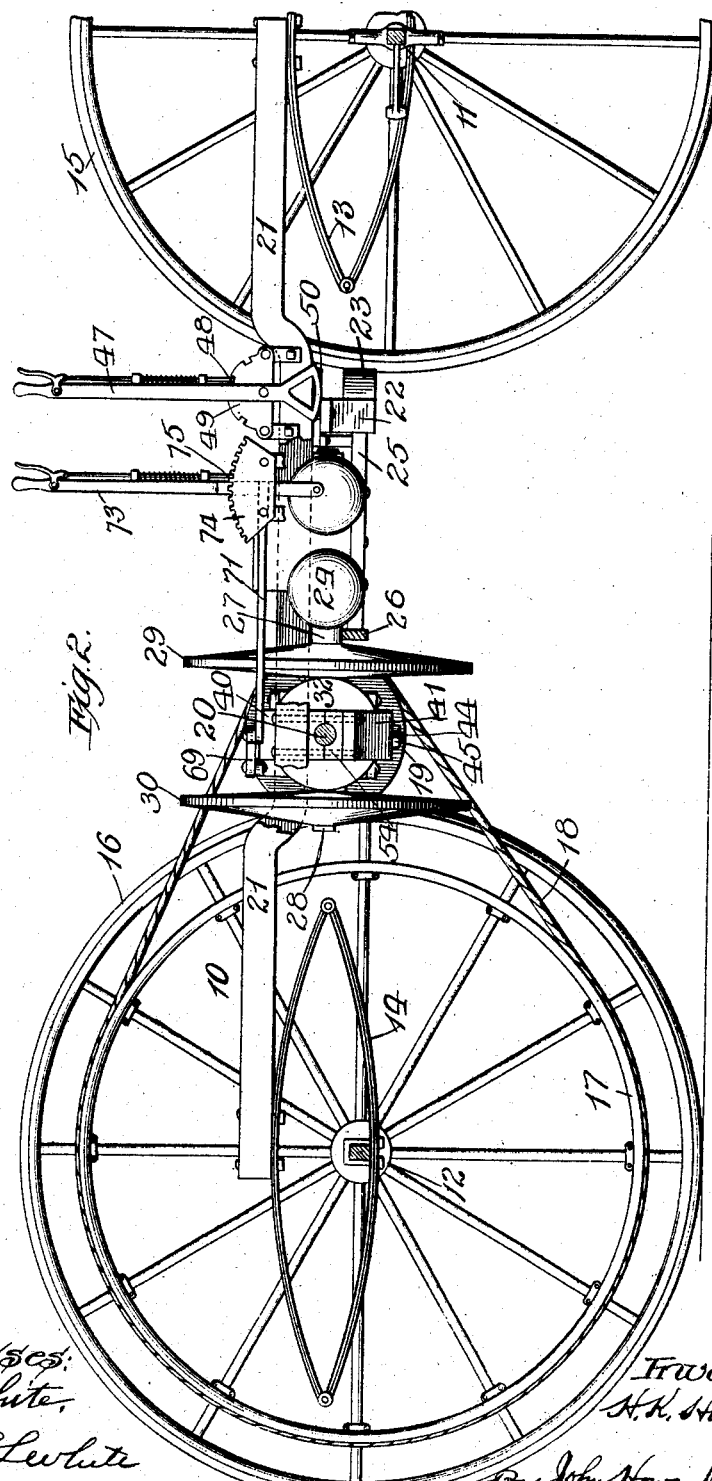

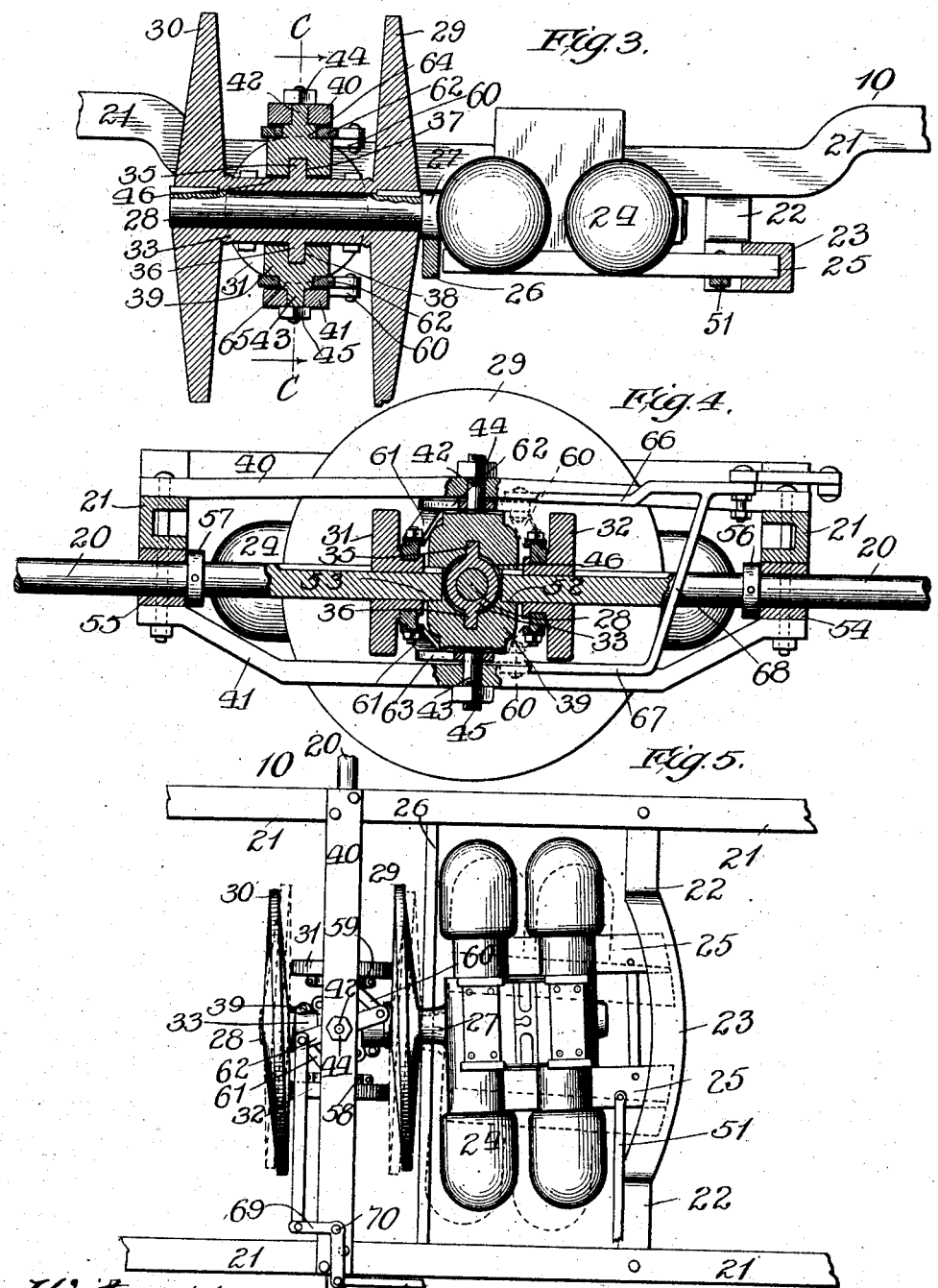

UNITED STATES PATENT OFFICE.

HENRY K. HOLSMAN, OF CHICAGO, ILLINOIS.

DRIVING MECHANISM FOR AUTOMOBILES, &c.

No. 878,954.　　　　Specification of Letters Patent.　　　　Patented Feb. 11, 1908.

Application filed April 20, 1907. Serial No. 369,198.

*To all whom it may concern:*

Be it known that I, HENRY K. HOLSMAN, a citizen of the United States, and a resident of Chicago, in the county of Cook and State of Illinois, have invented certain new and useful Improvements in Driving Mechanism for Automobiles, &c., of which the following is a full, clear, and exact specification.

My invention is concerned with a novel friction driving device in which a motor shaft carrying a pair of oppositely-facing driving-disks is employed in combination with one or more driven disks secured to or splined on a driving shaft (which may be single, if but one driven disk is employed, or two-part, if two are employed), so that as the motor shaft is moved from its central disengaging position, one of the two sets of disks will be engaged so as to drive the machine forward or backward, depending upon which direction the motor shaft and its connected disks are moved. If, as is preferred, the driven disk or disks are splined on their shaft, they can be moved nearer to or farther from the center of the driving disks, so as to diminish or increase the speed.

To illustrate my invention, I annex hereto three sheets of drawings, in which the same reference characters are used to designate identical parts in all the figures, of which—

Figure 1 is a top plan view of the running gears of an automobile having my invention applied thereto. Fig. 2 is a side elevation of the same in section on the line A—A of Fig. 1. Fig. 3 is a detail, upon an enlarged scale, in section on the line B—B of Fig. 1. Fig. 4 is a similar view in section on the line C—C of Fig. 3; and Fig. 5 is a view of the mechanism shown in the central portion of Fig. 1, but with the apparatus shifted to the forward driving position in full lines and to the backward driven position in dotted lines.

My invention is intended primarily for driving automobiles, and accordingly I have illustrated it as applied to a rope-drive automobile of the general type shown in my Patent No. 697,720, granted April 15, 1902. In this type of automobile, the rectangular framework 10 of the running gears is supported upon the front and rear axle bars 11 and 12, preferably through the medium of the interposed elliptical springs 13 and 14. The steering wheels 15 are mounted on axles pivoted on the axle bar 11, and suitably connected and arranged for steering. The traction wheels 16 are journaled on the axles formed on the ends of the rear axle-bar 12, and are provided with the rope sheaves 17 secured thereto, over which pass the ropes 18, which also pass over the driving sheaves 19 secured on the ends of the driving shaft 20. Of course, it will be understood that any sort of driving connections between the shafts 20 and the traction wheels 16 might be employed, and I have merely indicated the form shown for convenience of illustration.

The frame 10 has the rigid side bars 21, which are preferably offset, as shown in Fig. 2, so as to lower the central portions thereof beneath the level of the bottom of the body portion, which is not illustrated. In addition to the end cross-pieces, the forward cross-piece 22 is employed, which, as best seen in Fig. 3, is preferably of a channel shape and has the central portion 23 curved about the pivotal center of the engine, as will be described. The engine 24, which is indicated conventionally as of the opposed four-cylinder type, has the frame pieces 25, the ends of which slide in the curved portion 23 of the cross piece 22 as a bearing. Another cross bar 26 is employed, upon which slides the lower surface of the bearing 27. The engine shaft 28 is journaled in this bearing 27, and has rigidly secured thereon the pair of opposed disks 29 and 30, which have their faces preferably slightly cone-shaped or beveled so as to engage with the driven disks 31 and 32 in the same angular position in all adjustments of the disks 31 and 32, which are preferably movable toward and from each other, and at the same time to and from the center of the driving disks 29 and 30, so as to vary the rate of speed as may be desired. The shaft 28 between the disks 29 and 30 is journaled in the bearing sleeve 33, which is provided with the vertical bearing studs 35 and 36 projecting into the bearing recesses 37 and 38 formed in the bearing block 39, which is supported between the cross pieces 40 and 41 extending between the two side bars 21. The bearing block 39 has the shouldered studs 42 and 43, which pass through suitable apertures in the cross pieces 40 and 41, and have their outer ends threaded, so that the block may be rigidly secured between these cross pieces by tightening up the nuts 44 and 45. The horizontal aperture 46 through the bearing block 39 flares horizontally from its center so as to permit the swinging of the motor and its shaft from the full-line to the dotted-line position of Fig. 5, and this movement is effected in any convenient manner, as by means of the hand lever 47, which has the detent pawl 48 coöperating with the detent segment 49, the hand lever and segment being pivoted and secured, respectively, upon the adjacent side bar 21 in any suitable manner. The lower end of the hand lever 47 is connected with the bell crank 50 pivoted on the under side of the adjacent side bar 21 by gear segment connections which permit the swinging of the lever and the bell crank. The other arm of the bell crank has the link 51 pivoted thereto, the other end of which is pivoted to one of the frame pieces 25, and it will be readily apparent that as the lever 47 is swung from the vertical position of Figs. 1 and 2, in one or the other direction, the engine will be moved either to the full-line or the dotted-line position of Fig. 5, in which the driving disks 29 and 30 engage with the opposite sides of the driven disks 31 and 32, so that both of them will be driven in the same direction, thus driving both traction wheels forward or backward, as the case may be.

The shaft 20 is shown as divided in two parts, the inner ends being journaled in bearing recesses 52 and 53 formed in the bearing block 39, while they are also journaled in the bearings 54 and 55 secured to the under side of the side bars 21 between them and the ends of the cross piece 41. Collars 56 and 57, or other suitable means, are provided to prevent the longitudinal movement of the portions of the shaft 20 in its bearings. The driven disks 31 and 32 are preferably splined upon their sections of the shaft, as shown, in order to permit of a change of the speed; and to conveniently move them, I provide them with the collars 58 and 59, which have the pairs of links 60 and 61 pivoted thereto, the other ends of which are pivoted to the levers 62 and 63, which are journaled on bearings 64 and 65 formed on the shouldered studs immediately adjacent the shouldered portions thereof. The levers 62 and 63 are pivoted to the arms 66 and 67, which are connected at their outer ends, as by the rigid piece 68, and the outer end is pivoted to the bell crank 69 which is pivoted at 70 to the adjacent side bar 21, and has the link 71 pivoted to the other arm and extending to the lower end of the speed-changing hand-lever 73, which, together with its associated detent segment 74, are pivoted and secured, respectively, to the adjacent side bar 21. The detent 75, coöperating with the segment 74, is spring-held, so that the disks 31 and 32 can be held in any desired position of adjustment.

The operation of the complete apparatus will be readily apparent from the foregoing description. By bringing the lever 47 to its vertical position, the vehicle is stopped, as neither of the driving disks 29 and 30 engage the driven disks 31 and 32. If the hand lever 47 is moved so as to swing the engine to the full-line position of Fig. 5, the driving disks 29 and 30 engaging the driven disks 31 and 32, respectively, will drive the vehicle forward. If the position of the parts is reversed to the dotted-line position of Fig. 5, the disks 29 and 30 engaging the disks 31 and 32, respectively, will drive the vehicle backward. The speed is controlled by the adjustment of the hand lever 73, which adjustment is preferably made when the vehicle is at rest, and it will be apparent that the closer the disks 31 and 32 are brought together the slower the vehicle will be driven, as the surface velocity of the engaging portions of the disks 29 and 30 will be correspondingly less.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is,—

1. In a device of the class described, the combination with the driving shaft and the pair of disks with their driving surfaces facing each other secured thereto, of the driven shaft and the driven disk carried thereby located between the driving disks, and means for translating said driving shaft to engage one or the other of the driving disks with the driven disk.

2. In a device of the class described, the combination with the driving shaft and the pair of oppositely-facing disks secured thereto, of the driven shaft journaled in suitable bearings, the driven disk splined hereon between the driving disks, means for moving the driven disk lengthwise of its shaft to vary the speed, and means for translating said driving shaft to engage one or the other of the driving disks with the driven disk.

3. In a device of the class described, the combination with the driving shaft and the pair of oppositely-facing beveled disks secured thereto, of the driven shaft journaled in suitable bearings, the driven disk splined thereon between the driving disks, means for moving the driven disk lengthwise of its shaft to vary the speed, and means for translating said driving shaft to engage one or the other of the driving disks with the driven disk.

4. In a device of the class described, the combination with the driving shaft and the pair of disks with their driving surfaces facing each other secured thereto, of the driven shaft, a pair of driven disks carried thereby located between the driving disks and on either side of the center thereof, and means for translating said driving shaft to engage one or the other of the driving disks with the driven disks.

5. In a device of the class described, the combination with the driving shaft and the pair of disks with their driving surfaces facing each other secured thereto, of the two-part driven shaft, a pair of driven disks carried thereby located between the driving disks and on either side of the center thereof, and means for translating said driving shaft to engage one or the other of the driving disks with the driven disks.

6. In a device of the class described, the combination with the driving shaft and the pair of oppositely-facing disks secured thereto, of the driven shaft journaled in suitable bearings, the pair of driven disks splined on the driven shaft and located between the driving disks and on either side of the center thereof, means for simultaneously moving the driven disks lengthwise of their supporting shaft to vary the speed, and means for translating said driving shaft to engage one or the other of the driving disks respectively with the driven disks.

7. In a device of the class described, the combination with the driving shaft and the pair of oppositely-facing beveled disks secured thereto, of the driven shaft journaled in suitable bearings, the pair of driven disks splined on the driven shaft and located between the driving disks and on either side of the center thereof, means for simultaneously moving the driven disks lengthwise of their supporting shaft to vary the speed, and means for translating said driving shaft to engage one or the other of the driving disks respectively with the driven disks.

8. In a device of the class described, the combination with the framework and the bearing member secured therein, of the driving shaft having a bearing swiveled in the bearing member, the opposed driving disks secured to the shaft on the opposite sides of the member, the driven shaft having one bearing in the member and the other in the frame, a driven disk carried by the driven shaft between the driving disks, and means for swinging the driving shaft to engage one or the other of the driving disks with the driven disk.

9. In a device of the class described, the combination with the framework and the bearing member secured therein, of the driving shaft having a bearing swiveled in the bearing member, opposed driving disks secured to the shaft on opposite sides of the member, the driven shaft having one bearing in the member and the other in the frame, a driven disk splined on the driven shaft between the driving disks, means for moving the driven disk lengthwise of its shaft to vary the speed, and means for swinging said driving shaft to engage one or the other of the driving disks with the driven disk.

10. In a device of the class described, the combination with the framework and the bearing member secured therein, of the driving shaft having a bearing swiveled in the bearing member, the opposed beveled driving disks secured to the shaft on the opposite sides of the member, the driven shaft having one bearing in the member and the other in the frame, a driven disk splined on the driven shaft between the driving disks, means for moving the driven disk lengthwise of its shaft to vary the speed, and means for swinging said driving shaft to engage one or the other of the driving disks with the driven disk.

11. In a device of the class described, the combination with the framework and the bearing member secured therein, of the driving shaft having a bearing swiveled in the bearing member, the opposed driving disks secured to the shaft on opposite sides of the member, the two-part driven-shaft, each part having one bearing in the member and the other in the frame, a pair of driven disks carried by the two parts of the driven shaft between the driving disks and on opposite sides of the bearing member, and means for swinging the driving shaft to engage the driving disks with one or the other of the driven disks.

12. In a device of the class described, the combination with the framework and the bearing member secured therein, of the driving shaft having a bearing swiveled in the bearing member, the opposed driving disks secured to the shaft on opposite sides of the member, the two-part driven-shaft, each part having one bearing in the member and the other in the frame, a pair of driven disks splined on the two parts of the driven shaft between the driving disks and on opposite sides of the bearing member, means for moving the driven disks lengthwise of their portions of the shaft to vary the speed, and means for swinging the driving shaft to engage the driving disks with one or the other of the driven disks.

13. In a device of the class described, the combination with the framework and the bearing member secured therein, of the driving shaft having a bearing swiveled in the bearing member, the opposed beveled driving disks secured to the shaft on opposite sides of the member, the two-part driven-shaft, each part having one bearing in the member and the other in the frame, a pair of driven disks splined on the two parts of the driven shaft between the driving disks and on opposite sides of the bearing member, means for moving the driven disks lengthwise of their portions of the shaft to vary the speed, and means for swinging the driving shaft to engage the driving disks with one or the other of the driven disks.

14. In a device of the class described, the combination with the supporting framework, of the motor movably mounted on said framework and having the driving shaft, the pair of oppositely-facing disks secured thereto, the driven shaft, and the friction disk carried thereby located between the driving disks, and means for translating said motor to engage one or the other of the driving disks with the driven disks.

15. In a device of the class described, the combination with the supporting framework, of the motor movably mounted on said framework and having the driving shaft, the pair of oppositely-facing disks secured thereto, the driven shaft journaled in suitable bearings, the driven disk splined thereon between the driving disks, means for moving the driven disk lengthwise of its shaft to vary the speed, and means for translating said motor to engage one or the other of the driving disks with the driven disk.

16. In a device of the class described, the combination with the supporting framework, of the motor mounted so as to swing on said framework and having the driving shaft, the pair of oppositely-facing beveled disks secured thereto, the driven shaft journaled in suitable bearings in the framework, the driven disk splined thereon between the driving disks, means for moving the driven disk lengthwise of its shaft to vary the speed, and means for swinging the motor to engage one or the other of the driving disks with the driven disk.

17. In a device of the class described, the combination with the supporting framework, of the motor mounted to swing on said framework and having a driving shaft, the pair of oppositely-facing beveled disks secured thereto, the driven shaft, a pair of driven disks carried thereby located between the driving disks and on either side of the center thereof, and means for swinging the motor to engage one or the other of the driving disks with the driven disks.

18. In a device of the class described, the combination with the supporting framework, of the motor mounted to swing on said framework and having the driving shaft, the pair of oppositely-facing beveled disks secured thereto, the driven shaft journaled in suitable bearings in the framework, the pair of driven disks splined on the driven shaft and located between the driving disks and on either side of the center thereof, means for simultaneously moving the driven disks lengthwise of their supporting shaft to vary the speed, and means for swinging the motor to engage one or the other of the driving disks respectively with the driven disks.

19. In a device of the class described, the combination with the framework, the bearing block secured therein, and the segmental bearing for the motor carried thereby, of the motor having one end mounted to move in the segmental bearing and with its shaft provided with a bearing swiveled in the block, the opposed driving disks secured to the shaft on the opposite sides of the block, the driven shaft having one bearing in the block and the other in the frame, a driven disk carried by the driven shaft between the driving disks, and means for swinging the motor to engage one or the other of the driving disks with the driven disk.

20. In a device of the class described, the combination with the framework, the bearing block secured therein, and the segmental bearing carried thereby, of the motor having one end mounted to swing in the segmental bearing, and provided with a shaft having a bearing swiveled in the bearing block, the opposed beveled driving disks secured to the shaft on the opposite sides of the block, the driven shaft having one bearing in the block and the other in the frame, a driven disk splined on the driven shaft between the driving disks, means for moving the driven disk lengthwise of its shaft to vary the speed, and means for swinging said motor to engage one or the other of the driving disks with the driven disk.

21. In a device of the class described, the combination with the framework, the bearing block secured therein and the segmental bearing carried thereby, of the motor having one end mounted to swing in the segmental bearing and having its shaft provided with a bearing swiveled in the bearing block, the opposed beveled driving disks secured to the shaft on opposite sides of the block, the two-part driven shaft, each part having one bearing in the block and the other in the frame, a pair of driven disks splined on the two parts of the driven shaft between the driving disks and on opposite sides of the bearing block, means for moving the driven disks lengthwise of their portions of the shaft to vary the speed, and means for swinging the motor to engage the driving disks with one or the other of the driven disks.

22. In a device of the class described, the combination with the framework, of the motor movably mounted thereon, the driving shaft of said motor, the pair of driving members carried by the shaft, the driven shaft, the driven member carried by the driven shaft, and means for translating said motor to engage one or the other of the driving members with the driven member.

23. In a device of the class described, the combination with the supporting framework, of the motor movably mounted thereon, the driving shaft of said motor, the pair of friction driving members carried by the shaft, the driven shaft, the friction driven member carried by the driven shaft, and means translating said motor to engage one or the other of the driving members with the driven member.

24. In a device of the class described, the combination with the supporting framework, of the motor movably mounted thereon, the driving shaft of said motor, the pair of friction driving disks carried by the shaft, the driven shaft, the friction driven disk carried by the driven shaft, and means for translating said motor to engage one or the other of the driving disks with the driven disk.

25. In a device of the class described, the combination with the supporting framework, of the motor movably mounted thereon, the driving shaft of said motor, the pair of driving members carried by the shaft, the driven shaft, the driven member splined thereon between the driving members, means for moving the driven member lengthwise of its shaft to vary the speed, and means for translating said motor to engage one or the other of the driving members with the driven member.

26. In a device of the class described, the combination with the supporting framework, of the motor movably mounted thereon, the driving shaft of said motor, the pair of driving members carried by the shaft, the driven shaft, the pair of driven members carried thereby located between the driving members and on either side of the center thereof, and means for translating said motor to engage one or the other of the driving members with the driven members.

27. In a device of the class described, the combination with the supporting framework, of the motor movably mounted thereon, the driving shaft of said motor, the pair of driving members carried by the shaft, the driven shaft, the pair of driven members splined on the driven shaft and located between the driving members and on either side of the center thereof, means for simultaneously moving the driven members lengthwise of their supporting shafts to vary the speed, and means for translating said motor to engage one or the other of the driving members with the driven members.

28. In a device of the class described, the combination with the supporting framework, the bearing block secured therein, and the segmental bearing for the motor carried thereby, of the motor having one end mounted to move in the segmental bearing and with its shaft provided with a bearing swiveled in the block, the opposed driving members secured to the shaft on the opposite sides of the block, the driven shaft having one bearing in the block and the other in the frame, a driven member carried by the driven shaft between the driving members, and means for swinging the motor to engage one or the other of the driving members to the driven member.

29. In a device of the class described, the combination with the framework, the bearing block secured therein, and the segmental bearing carried thereby, of the motor having one end mounted to swing in the segmental bearing, and provided with a shaft having a bearing swiveled in the bearing block, the opposed beveled driving members secured to the shaft on the opposite sides of the block, the driven shaft having one bearing in the block and the other in the frame, a driven member splined on the driven shaft between the driving members, means for moving the driven member lengthwise of its shaft to vary the speed, and means for swinging said motor to engage one or the other of the driving members with the driven member.

30. In a device of the class described, the combination with the framework, the bearing block secured therein and the segmental bearing carried thereby, of the motor having one end mounted to swing in the segmental bearing and having its shaft provided with a bearing swiveled in the bearing block, the opposed beveled driving members secured to the shafts on opposite sides of the block, the two-part driven shaft, each part having one bearing in the block and the other in the frame, a pair of driving members splined on the two parts of the driven shaft between the driving members and on opposite sides of the bearing blocks, means for moving the driven members lengthwise of their portions of the shaft to vary the speed, and means for swinging the motor to engage the driving members with one or the other of the driven members.

In witness whereof, I have hereunto set my hand and affixed my seal, this 17th day of April, A. D. 1907.

HENRY K. HOLSMAN. [L. S.]

Witnesses:
JOHN HOWARD McELROY,
M. S. REEDER.